United States Patent Office 2,806,881
Patented Sept. 17, 1957

2,806,881

PRODUCTION OF ACRYLAMIDE

Floyd B. Porter, Jr., Watertown, Conn., assignor to American Cyanamid Company, New York, N. Y., a corporation of Maine No Drawing. Application July 25, 1955,
Serial No. 524,290

2 Claims. (Cl. 260—561)

This invention relates to unsaturated organic amides. More particularly, it relates to the preparation of unsaturated organic amides, especially acrylamide. Still more particularly, it relates to the separation of an unsaturated organic amide from a reaction mixture comprising the amide sulfate.

Various organic amides have recently become important in various fields. Particularly is this true of acrylamide and its polymerization and copolymerization products. These products have been of particular interest, for instance, in the fields of adhesives, dispersants, plasticizers, surface coatings, thickening agents, as well as in the leather, paper, textile and photographic arts. Because of these many potential applications, there has been an increasing interest in improved processes for producing such unsaturated organic amides.

One method for preparing such amides comprises reacting the corresponding nitrile with water and concentrated sulfuric acid. The reaction mixture comprising the amide sulfate is then further treated to separate the free amide. In the case of amides insoluble in water, this is easily accomplished by the addition of the reaction mixture to excess water and/or ice. However, for those amides, such as acrylamide, which are exceedingly soluble in water, separation obviously cannot be conducted in this manner.

One method of separating a water-soluble amide from a reaction mixture comprising the amide sulfate is to treat the aqueous amide sulfate solution with lime. Sulfuric acid is thus removed as insoluble calcium sulfate, leaving a solution of the free amide. After separating the calcium sulfate by filtration or equivalent means, the aqueous solution is concentrated and cooled to crystallize the amide, which may be separated by conventional means.

In the neutralization of acrylamide sulfate by this method, it is essential that the hydrogen ion concentration be controlled within narrow limits. This is necessary to minimize side reactions and hydrolysis which occur under conditions of excessive acidity or alkalinity in the neutralization slurry. Accordingly, the hydrogen ion concentration must be controlled and maintained between that equivalent to about a pH of 6 to 9, and preferably 7 to 8. This is most conveniently done by simultaneously adding an aqueous slurry of lime and the acrylamide sulfate solution to water. By proper adjustment of the rates of addition of the two materials, the pH may be quite easily maintained within the desired limits.

One of the disadvantages of neutralizing with lime is the fact that commercial lime generally contains from about 1–2% of magnesium as magnesium oxide. During the process of neutralization within the range of hydrogen ion concentrations described above, this magnesium oxide is converted to magnesium sulfate. The latter is quite soluble in the resultant aqueous acrylamide solution and, accordingly, is not removed during the subsequent separation of calcium sulfate.

The presence of magnesium sulfate in the residual liquor causes processing difficulties during subsequent operations to recover pure crystalline acrylamide. For instance, the residual acrylamide liquor obtained after separation of the calcium sulfate is subjected to flash evaporation to concentrate the liquor to about 65% acrylamide. A portion of the concentrated solution is then subjected to crystallization while the remainder is recycled to the flashing operation. As a result, there is a constant build up of soluble magnesium sulfate in the concentrated liquor and the eventual appearance during crystallization of a second solid phase, which has been determined to be a magnesium sulfate-acrylamide double salt.

This difficulty may be averted by using a specially prepared low magnesium-bearing lime as the neutralizing agent. It is neither a practical nor an economically satisfactory solution to the problem, however, particularly in view of the wide availability of commercial lime having a 2% magnesium content. The problem may also be solved and the presence of the double salt eliminated by crystallizing from concentrations at which acrylamide alone can be isolated. This, however, is not practical because the concentration range at which acrylamide, free of the double salt, can be isolated is relatively limited. Moreover, it does not eliminate the magnesium sulfate which continues to build up in the system.

There has remained, therefore, a continued demand for an expedient by which the known lime neutralization procedure may be conducted on solutions of insoluble amide sulfates, such as acrylamide, without the disadvantages encountered by the presence of a small amount of magnesium in the neutralizing agent. It is the primary object of this invention to fill this demand. It is a further object to eliminate the difficulties heretofore attendant in the lime neutralization process while at the same time using commercially available magnesium-bearing lime as the neutralizing agent.

These objects have been accomplished in accordance with the present invention in a simple, yet surprisingly effective, manner. In general, the improvement of this invention comprises raising the pH of the neutralized or substantially completely neutralized slurry prior to separation of calcium sulfate, whereby soluble magnesium sulfate is precipitated as magnesium hydroxide. Resultant slurry is then subjected to filtration to remove both the calcium and the magnesium ions, leaving a substantially calcium- and magnesium-free aqueous acrylamide liquor.

Although quite simply stated, there are various factors concerning the procedure which should be observed. For instance, the extent to which alkalinity is increased should be carefully controlled. Excessive alkalinity will increase the possibilities of side reactions and hydrolysis. Accordingly, the hydrogen ion concentration should be adjusted to not greater than about that equivalent to a pH of 12, and preferably from 10 to 12. The period of time during which increased alkalinity is maintained must also be considered. The longer increased alkalinity is maintained, the greater the possibility of side reactions and hydrolysis. In general, magnesium precipitation can be accomplished in a rather short period of time, e. g., 15–30 minutes, as compared to the extended time period required in the neutralization step. Since it may be conducted in a relatively short period, precipitation of the magnesium content may be conducted as a separate step after neutralization is complete. Alternatively, it may be conducted during the latter part of the neutralization step. This is preferred, since calcium sulfate precipitated during neutralization serves as a filter aid in separating the difficult-to-filter magnesium hydroxide.

Hydrogen ion adjustment for removal of the magnesium content as magnesium hydroxide may be accomplished by the addition of any of a wide variety of bases; for example, the oxides and hydroxides of the alkali metals and alkaline earth metals. Because of its ready availability and its use as the neutralizing agent, lime is the desired material. Accordingly, it constitutes a preferred embodiment of this invention. The small magnesium content of the lime will be precipitated as hydroxide under the adjusted pH conditions. After separation of the calcium and magnesium precipitates, the hydrogen ion concentration of the residual acrylamide liquor is adjusted, by the addition of sulfuric or other acid, to a pH of 7–8 for the recovery of the acrylamide content.

The process of this invention is further described by the following examples. These are intended to be illustrative only and not by way of limitation. Unless otherwise indicated, all parts are by weight.

*Example 1*

To 2000 parts of water is added 517 parts of crude acrylamide sulfate and a lime slurry of 275 parts of hydrated chemical lime in 550 parts of water at rates such that the pH of the reaction medium is maintained at 6–9. On completion of neutralization, the slurry is filtered to separate the calcium sulfate. Residual acrylamide solution is analyzed and found to contain 0.107 gram magnesium as $MgSO_4 \cdot 7H_2O$ per liter of solution.

*Example 2*

To 135 parts of the residual acrylamide solution of Example 1 at a pH of 8.4 is added, with stirring, a lime slurry until the pH is 10.2. The slurry is then filtered to separate the magnesium hydroxide. Residual acrylamide liquor is then analyzed and found to contain 0.021 gram of magnesium as $MgSO_4 \cdot 7H_2O$ per liter of solution.

I claim:

1. In a process of preparing acrylamide by neutralizing acrylamide sulfate in water at a pH not greater than about 9 with lime containing about 1–2% magnesium as magnesium oxide whereby the calcium and magnesium contents of said lime are converted to insoluble calcium sulfate and soluble magnesium sulfate, and said calcium sulfate is separated leaving a solution of acrylamide, the improvement of insolubilizing the magnesium content without deleteriously affecting the acrylamide which comprises: adjusting the hydrogen ion concentration after neutralization is substantially complete but prior to the separation step to a pH of about 10–12, maintaining said pH for about 15–30 minutes whereby magnesium sulfate formed during neutralization is precipitated as magnesium hydroxide, separating solids, and adjusting the hydrogen ion concentration of the residual liquor to less than about pH 9.

2. A process according to claim 1 in which adjustment of the hydrogen ion concentration is made by the addition of lime.

References Cited in the file of this patent

UNITED STATES PATENTS

| | | |
|---|---|---|
| 2,140,469 | Crawford | Dec. 13, 1938 |
| 2,683,173 | Weisgerber | July 6, 1954 |

FOREIGN PATENTS

| | | |
|---|---|---|
| 753,624 | Germany | July 21, 1952 |
| 631,592 | Great Britain | Nov. 7, 1949 |